United States Patent
You et al.

(10) Patent No.: US 11,057,914 B2
(45) Date of Patent: Jul. 6, 2021

(54) DOWNLINK CONTROL INFORMATION RECEIVING METHOD AND USER EQUIPMENT, AND DOWNLINK CONTROL INFORMATION TRANSMISSION METHOD AND BASE STATION

(71) Applicant: LG ELECTRONICS INC., Seoul (KR)

(72) Inventors: Hyangsun You, Seoul (KR); Yunjung Yi, Seoul (KR); Eunsun Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/744,512

(22) PCT Filed: Jul. 25, 2016

(86) PCT No.: PCT/KR2016/008086
§ 371 (c)(1),
(2) Date: Jan. 12, 2018

(87) PCT Pub. No.: WO2017/018758
PCT Pub. Date: Feb. 2, 2017

(65) Prior Publication Data
US 2018/0234998 A1 Aug. 16, 2018

Related U.S. Application Data

(60) Provisional application No. 62/196,303, filed on Jul. 24, 2015, provisional application No. 62/256,032, (Continued)

(51) Int. Cl.
*H04W 72/12* (2009.01)
*H04L 5/00* (2006.01)
(Continued)

(52) U.S. Cl.
CPC ....... *H04W 72/1273* (2013.01); *H04L 5/0053* (2013.01); *H04W 72/042* (2013.01);
(Continued)

(58) Field of Classification Search
CPC ......... H04W 72/1273; H04W 72/1289; H04W 72/042; H04W 72/0446; H04L 5/00; H04L 5/14
See application file for complete search history.

(56) References Cited

U.S. PATENT DOCUMENTS

| 8,634,374 B2* | 1/2014 | Yang | H04W 72/042 370/330 |
| 8,989,208 B2* | 3/2015 | Chen | H04W 72/042 370/445 |

(Continued)

FOREIGN PATENT DOCUMENTS

| CN | 102740462 A | 10/2012 |
| CN | 103503347 A | 1/2014 |

(Continued)

OTHER PUBLICATIONS

Ericsson, "Areas for Reducing Latency," 3GPP TSG-RAN WG2 #90, Tdoc R2-152415, Fukuoka, Japan, May 25-29, 2015, pp. 1-4.

(Continued)

*Primary Examiner* — Andrew Lai
*Assistant Examiner* — Chuong M Nguyen
(74) *Attorney, Agent, or Firm* — Birch, Stewart, Kolasch & Birch, LLP

(57) ABSTRACT

A method and an apparatus for transmitting/receiving downlink control information are provided. Downlink control information about a data channel may be transmitted through one of a plurality of decoding candidates. Depending on whether the data channel is based on a first sub-frame or a second sub-frame, the downlink control information is (Continued)

transmitted through one of the candidates for the first sub-frame or one of the candidates for the second sub-frame, from among the plurality of decoding candidates. The second sub-frame is shorter than the first sub-frame and can be set within the first sub-frame.

20 Claims, 10 Drawing Sheets

Related U.S. Application Data filed on Nov. 16, 2015, provisional application No. 62/288,444, filed on Jan. 29, 2016, provisional application No. 62/290,981, filed on Feb. 4, 2016.

(51) Int. Cl.
    *H04W 72/04*     (2009.01)
    *H04L 5/14*     (2006.01)

(52) U.S. Cl.
    CPC ....... *H04W 72/1289* (2013.01); *H04L 5/0044* (2013.01); *H04L 5/0087* (2013.01); *H04L 5/1469* (2013.01); *H04W 72/0446* (2013.01)

(56) References Cited

U.S. PATENT DOCUMENTS

| | | | |
|---|---|---|---|
| 2007/0030829 A1 | 2/2007 | Vimpari et al. | |
| 2008/0101303 A1 | 5/2008 | Kim | |
| 2009/0296833 A1 | 12/2009 | Sawahashi | |
| 2010/0303011 A1* | 12/2010 | Pan | H04L 5/0091 370/328 |
| 2013/0163543 A1* | 6/2013 | Freda | H04W 16/14 370/329 |
| 2013/0336263 A1* | 12/2013 | Wang | H04L 47/14 370/329 |
| 2014/0071954 A1* | 3/2014 | Au | H04W 72/0446 370/336 |
| 2014/0226607 A1* | 8/2014 | Holma | H04L 1/1812 370/329 |
| 2015/0215086 A1* | 7/2015 | Nakao | H04W 72/0446 370/329 |
| 2016/0088604 A1* | 3/2016 | Patel | H04L 5/0053 370/336 |
| 2017/0150367 A1* | 5/2017 | Han | H04L 5/0092 |
| 2017/0223687 A1* | 8/2017 | Kuchibhotla | H04L 5/0094 |
| 2017/0290008 A1* | 10/2017 | Tooher | H04L 1/1893 |
| 2017/0318564 A1* | 11/2017 | Lee | H04L 1/00 |

FOREIGN PATENT DOCUMENTS

| | | |
|---|---|---|
| CN | 104025496 A | 9/2014 |
| CN | 104468030 A | 3/2015 |
| CN | 104620629 A | 5/2015 |
| CN | 104662827 A | 5/2015 |
| EP | 3273618 A1 | 1/2018 |
| EP | 3280086 A1 | 2/2018 |
| WO | WO 2014/124164 A1 | 8/2014 |
| WO | WO 2016/064049 A1 | 4/2016 |

OTHER PUBLICATIONS

Qualcomm Incorporated, "Scope of Latency Reduction Study," 3GPP TSG-RAN WG2 Meeting #90, R2-152740, Fukuoka, Japan, May 25-29, 2015, 3 pages.

* cited by examiner

DOWNLINK CONTROL INFORMATION RECEIVING METHOD AND USER EQUIPMENT, AND DOWNLINK CONTROL INFORMATION TRANSMISSION METHOD AND BASE STATION

CROSS REFERENCE TO RELATED APPLICATIONS

This application is the National Phase of PCT International Application No. PCT/KR2016/008086, filed on Jul. 25, 2016, which claims priority under 35 U.S.C. 119(e) to U.S. Provisional Application Nos. 62/196,303, filed on Jul. 24, 2015, 62/256,032 filed on Nov. 16, 2015, 62/288,444, filed on Jan. 29, 2016, and 62/290,981 filed on Feb. 4, 2016, all of which are hereby expressly incorporated by reference into the present application.

TECHNICAL FIELD

The present disclosure relates to a wireless communication system and, more particularly, to a method and apparatus for transmitting or receiving control information.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a base station (BS) should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

Further, along with the technology development, overcoming delay or latency has emerged as an important issue. The performances of more and more applications depend on a delay/latency. Accordingly, there is a need for a method for reducing a delay/latency, compared to a legacy system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method for receiving downlink control information (DCI) by a user equipment (UE) includes receiving the DCI in a control region of a transmission time interval (TTI), and receiving downlink data based on the DCI. The TTI may be divided into the control region and a data region in a time domain. The data region may include a plurality of short TTIs (sTTIs) in the time domain. If the DCI is received in one of first decoding candidates among a plurality of decoding candidates in the control region, the downlink data may be received on a first downlink data channel allocated across the data region, and if the DCI is received in one of second decoding candidates among the plurality of decoding candidates, the downlink data may be received on a second downlink data channel allocated to one sTTI of the plurality of sTTIs.

In another aspect of the present disclosure, a UE for receiving DCI includes a radio frequency (RF) unit, and a processor connected to the RF unit. The processor may be configured to control the RF unit to receive the DCI in a control region of a TTI, and control the RF unit to receive downlink data based on the DCI. The TTI may be divided into the control region and a data region in a time domain. The data region may include a plurality of sTTIs in the time domain. If the DCI is received in one of first decoding candidates among a plurality of decoding candidates in the control region, the processor may be configured to control the RF unit to receive the downlink data on a first downlink data channel allocated across the data region, and if the DCI is received in one of second decoding candidates among the plurality of decoding candidates, the processor may be configured to control the RF unit to receive the downlink data on a second downlink data channel allocated to one sTTI of the plurality of sTTIs.

In another aspect of the present disclosure, a method for DCI by a base station (BS) includes transmitting the DCI in a control region of a TTI to a UE, and transmitting downlink data based on the DCI to the UE. The TTI may be divided into the control region and a data region in a time domain.

The data region may include a plurality of sTTIs in the time domain. If the DCI is transmitted in one of first decoding candidates among a plurality of decoding candidates in the control region, the downlink data may be transmitted on a first downlink data channel allocated across the data region, and if the DCI is transmitted in one of second decoding candidates among the plurality of decoding candidates, the downlink data may be transmitted on a second downlink data channel allocated to one sTTI of the plurality of sTTIs.

In another aspect of the present disclosure, a BS for transmitting DCI includes an RF unit, and a processor connected to the RF unit. The processor may be configured to control the RF unit to transmit the DCI in a control region of a TTI to a UE, and control the RF unit to transmit downlink data based on the DCI to the UE. The TTI may be divided into the control region and a data region in a time domain. The data region may include a plurality of sTTIs in the time domain. If the DCI is transmitted in one of first decoding candidates among a plurality of decoding candidates in the control region, the processor may be configured to control the RF unit to transmit the downlink data on a first downlink data channel allocated across the data region, and if the DCI is transmitted in one of second decoding candidates among the plurality of decoding candidates, the processor may be configured to control the RF unit to transmit the downlink data on a second downlink data channel allocated to one sTTI of the plurality of sTTIs.

In each aspect of the present disclosure, the one sTTI may be a first sTTI among the plurality of sTTIs.

In each aspect of the present disclosure, the TTI may have a duration of 1 ms.

The above technical solutions are merely some parts of the embodiments of the present disclosure and various embodiments into which the technical features of the present disclosure are incorporated can be derived and understood by persons skilled in the art from the following detailed description of the present disclosure.

Advantageous Effects

According to the present disclosure, uplink/downlink signals may be efficiently transmitted/received. Therefore, the overall throughput of a wireless communication system is improved.

According to an embodiment of the present disclosure, a low-price/low-cost user equipment (UE) may communicate with a base station (BS), while maintaining compatibility with a legacy system.

According to an embodiment of the present disclosure, a UE may be implemented with low price/low cost.

According to an embodiment of the present disclosure, coverage may be enhanced.

According to an embodiment of the present disclosure, a UE and a BS may communicate in a narrowband.

According to an embodiment of the present disclosure, a delay/latency may be reduced during communication between a UE and a BS.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure, illustrate embodiments of the present disclosure and together with the description serve to explain the principle of the present disclosure.

BEST MODE FOR CARRYING OUT THE INVENTION

Figure 1:
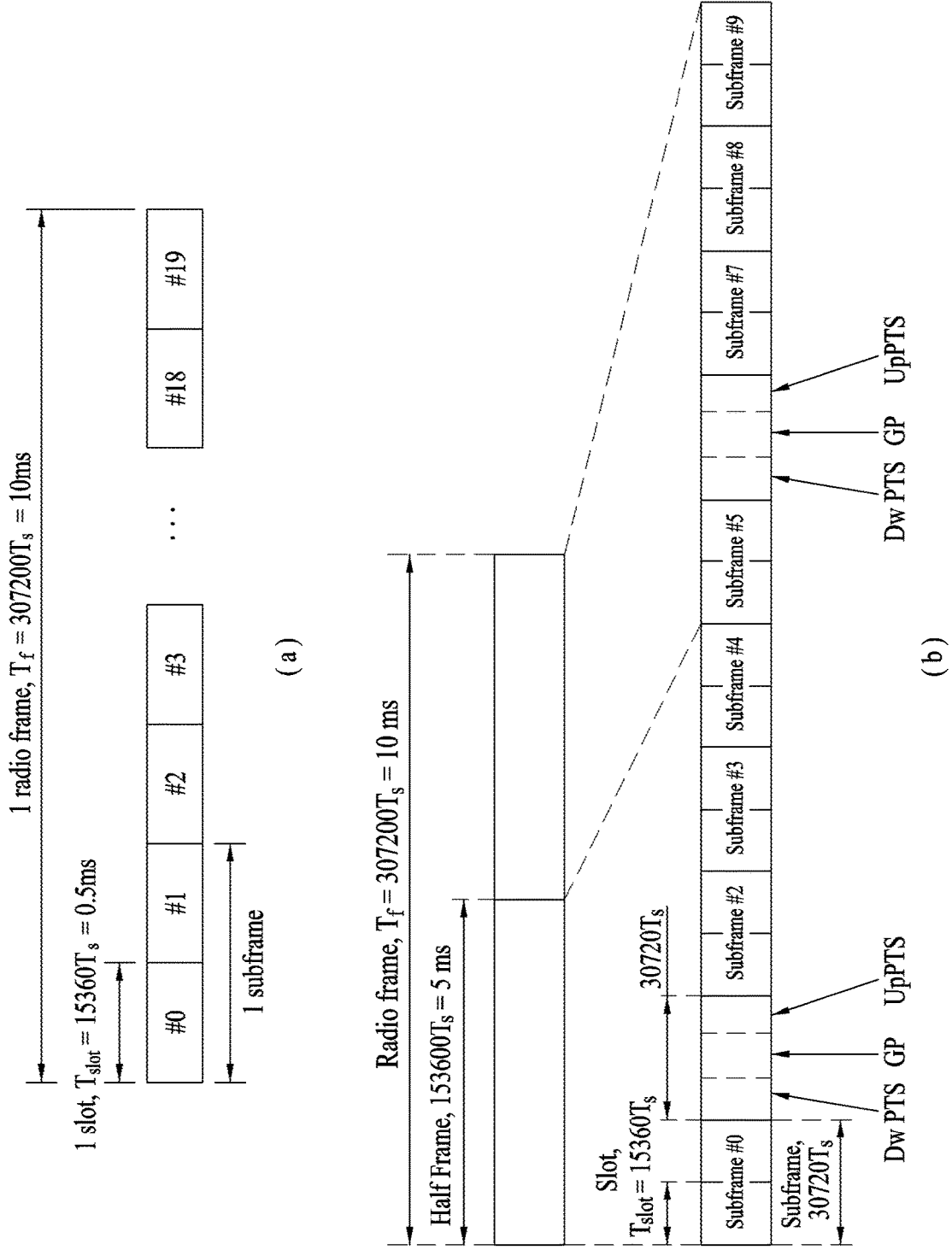
FIG. 1 illustrates an exemplary structure of a radio frame used in a wireless communication system.

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the disclosure. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present disclosure is applied to 3GPP LTE/LTE-A. However, the technical features of the present disclosure are not limited thereto. For example, although the following detailed description is given based on a mobile communication system corresponding to a 3GPP LTE/LTE-A system, aspects of the present disclosure that are not specific to 3GPP LTE/LTE-A are applicable to other mobile communication systems.

For example, the present disclosure is applicable to contention based communication such as Wi-Fi as well as non-contention based communication as in the 3GPP LTE/LTE-A system in which an evolved Node B (eNB) allocates a DL/UL time/frequency resource to a user equipment (UE) and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In the present disclosure, a UE may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present disclosure, a BS will be referred to as an eNB.

In the present disclosure, a node refers to a fixed point capable of transmitting/receiving a radio signal through communication with a UE. Various types of eNBs may be used as nodes irrespective of the terms thereof. For example, a BS, a node B (NB), an eNB, a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present disclosure, a cell refers to a prescribed geographic region to which one or more nodes provide a communication service. Accordingly, in the present disclosure, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. For a detailed CSI-RS configuration, refer to documents such as 3GPP TS 36.211 and 3GPP TS 36.331.

Meanwhile, a 3GPP LTE/LTE-A system uses the concept of a cell to manage a radio resource. A cell associated with the radio resource is different from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present disclosure, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present disclosure, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present disclosure, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | — |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | | |
| 9 | 13168 · $T_s$ | | | — | | |

Figure 2:
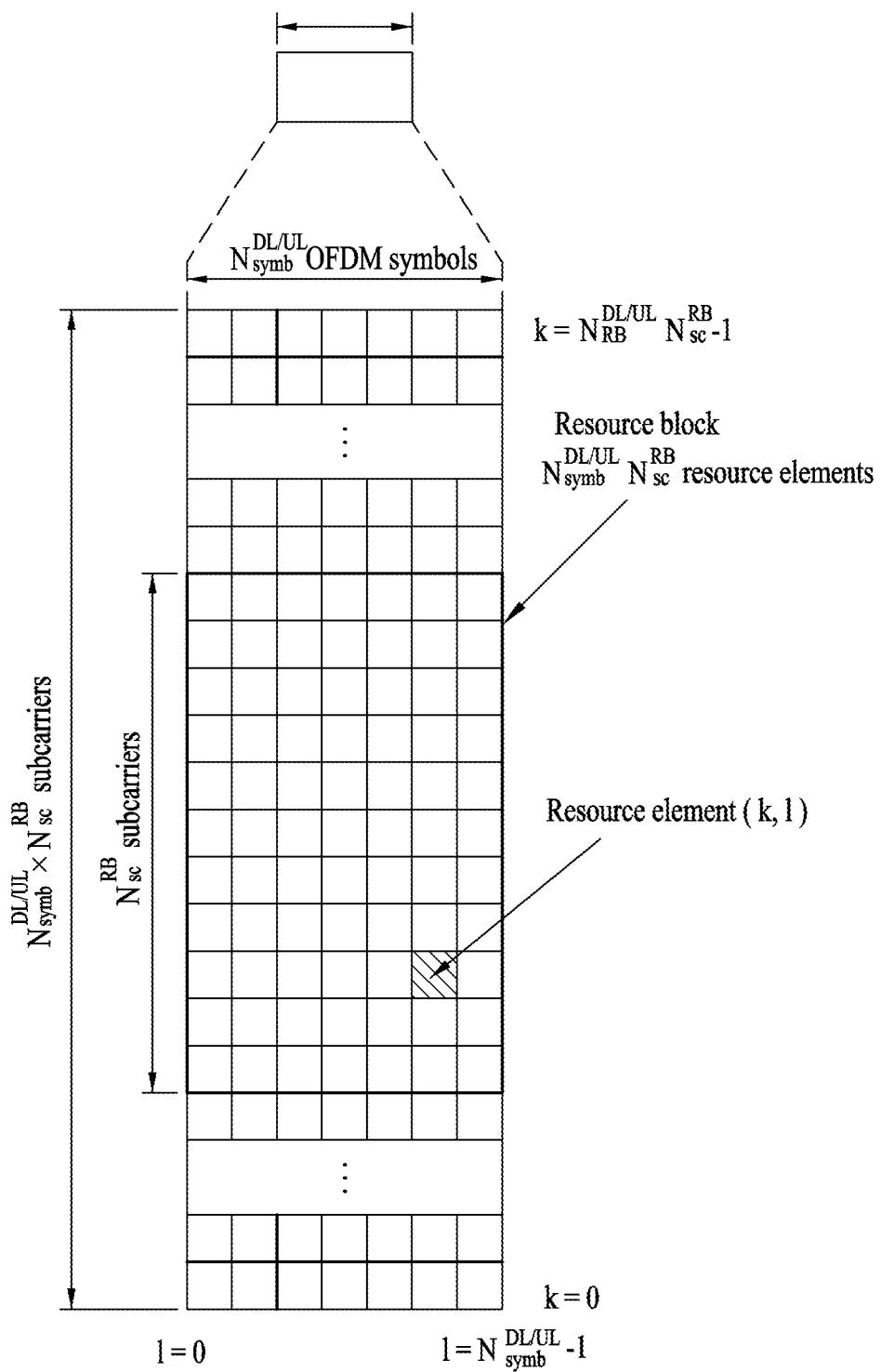
FIG. 2 illustrates an exemplary structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present disclosure are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
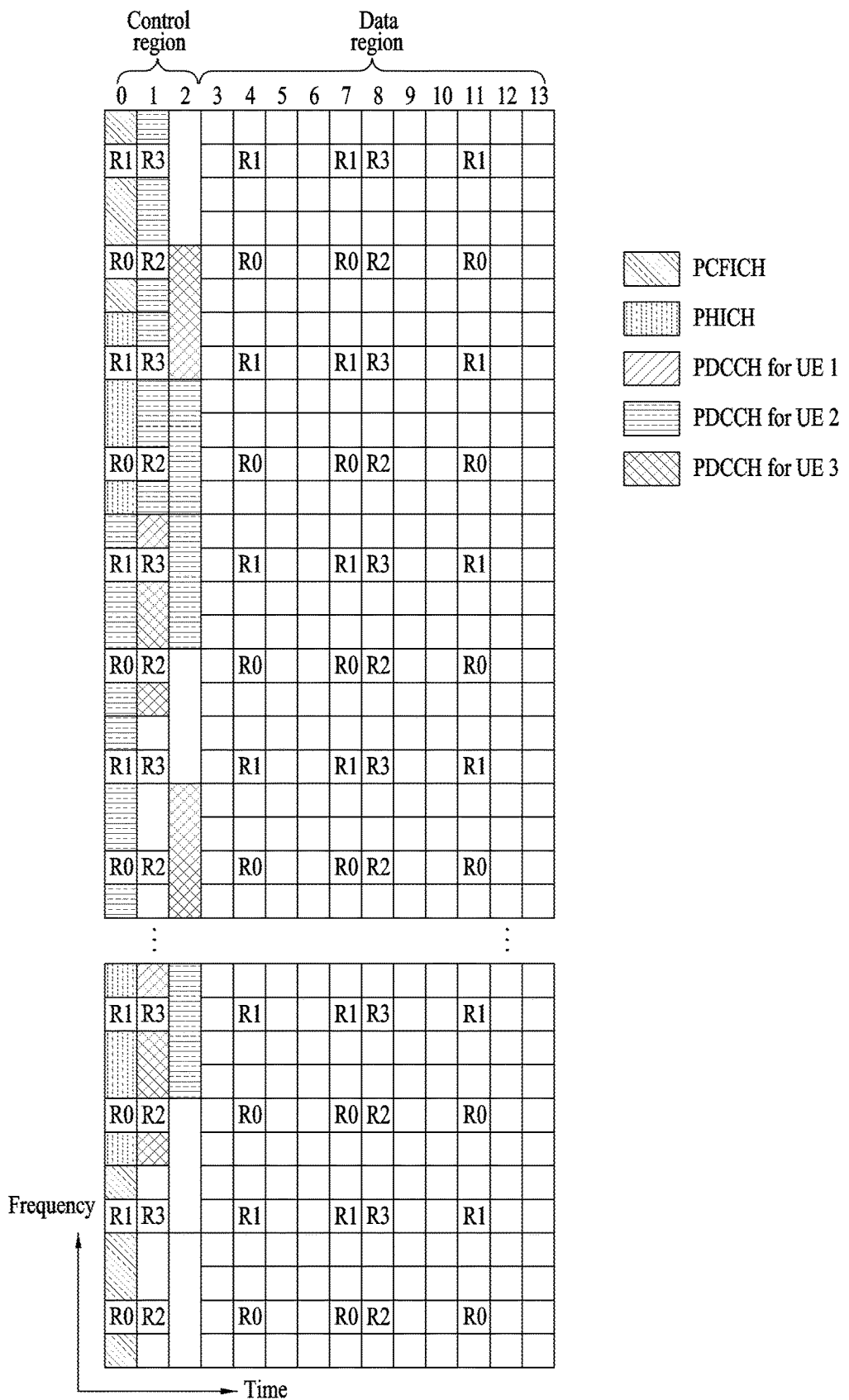
FIG. 3 illustrates an exemplary structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

subframe is defined as OFDM symbols which are not used in the non-MBSFN region.

The PCFICH carries a control format indicator (CFI), which indicates any one of values of 1 to 3. For a downlink system bandwidth $N^{DL}_{RB}>10$, the number 1, 2 or 3 of OFDM symbols which are spans of DCI carried by the PDCCH is given by the CFI. For a downlink system bandwidth $N^{DL}_{RB}\leq10$, the number 2, 3 or 4 of OFDM symbols which are spans of DCI carried by the PDCCH is given by CFI+1.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allo-

TABLE 3

| Subframe | Number of OFDM symbols for PDCCH when $N^{DL}_{RB} > 10$ | Number of OFDM symbols for PDCCH when $N^{DL}_{RB} \leq 10$ |
| --- | --- | --- |
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN cation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 4

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 4 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load according to blind decoding attempt, at a certain level or less, all DCI formats are not searched by the UE at the same time. Table 5 illustrates transmission modes for configuring multi-antenna technology and DCI formats for allowing a UE to perform blind decoding at the corresponding transmission mode. Particularly, Table 5 illustrates a relation between PDCCH and PDSCH configured by C-RNTI (Cell RNTI (Radio Network Temporary Identifier)).

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |

TABLE 5-continued

| Transmission mode | DCI format | Search Space | Transmission scheme of PDSCH corresponding to PDCCH |
|---|---|---|---|
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
| | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
| | DCI format 2D | UE specific by C-RNTI | Up to 8 layer transmission, ports 7-14 or single antenna port, port 7 or 8 |

Although transmission modes 1 to 10 are listed in Table 5, other transmission modes in addition to the transmission modes defined in Table 5 may be defined.

Referring to Table 5, a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

Besides a PDCCH decoded by means of a CRC scrambled with a C-RNTI illustrated in Table 5, a PDCCH decoded by means of a CRC scrambled with a semi-persistent scheduling (SPS) C-RNTI, a temporary C-RNTI, an SI-RNTI, or an RA-RNTI may be defined.

TABLE 6

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity. |

TABLE 7

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity |

TABLE 8

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity |

Table 6 illustrates an exemplary relationship between a PDCCH and a PDSCH, which have been configured by an SI-RNTI and which are to be detected in a CSS. Table 7 illustrates an exemplary relationship between a PDCCH and a PDSCH, which have been configured by a P-RNTI and which are to be detected in a CSS. Table 8 illustrates an exemplary relationship between a PDCCH and a PDSCH, which have been configured by an RA-RNTI and which are to be detected in a CSS.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs).

The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as a search space (SS). SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following table shows an example of aggregation levels for defining SSs. DCI formats that a UE should monitor depend on a transmission mode configured per serving cell.

TABLE 9

| Type | Search space $S^{(L)}_k$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Because the UE cannot perform blind decoding/detection (BD) infinitely, the number of BDs that the UE may perform in each subframe is defined. Referring to Table 9, the number of PDCCH candidates that the UE should monitor in a UE-specific search space (USS) including PDCCH candidates to carry UE-specific DCI is 6 for AL=1, 6 for AL=2, 2 for AL=4, and 2 for AL=8, thus 16 in total, and the number of PDCCH candidates that the UE should monitor in a common search space (CSS) including PDCCH candidates to carry common DCI is 4 for AL=4 and 2 for AL=8, thus 6 in total. Referring to Table 5, the UE monitors DCI format 1A in both the CSS and the USS, for every transmission mode, monitors DCI format 1A in both the CSS and the USS irrespective of its transmission mode, and monitors a DCI format specific to its transmission mode in the USS. For example, a Mode-10 UE monitors DCI format 1A in both the CSS and the USS, and further monitors DCI format 2D in the USS. According to Table 6 to Table 8, UE(s) further monitors DCI format 1C in addition to DCI format A in the CSS. Eventually, a UE attempts to decode each PDCCH candidate of the CSS and the USS in two DCI formats. Therefore, according to Table 9, a total of 44 decoding/detection attempts per subframe may be performed.

Figure 4:
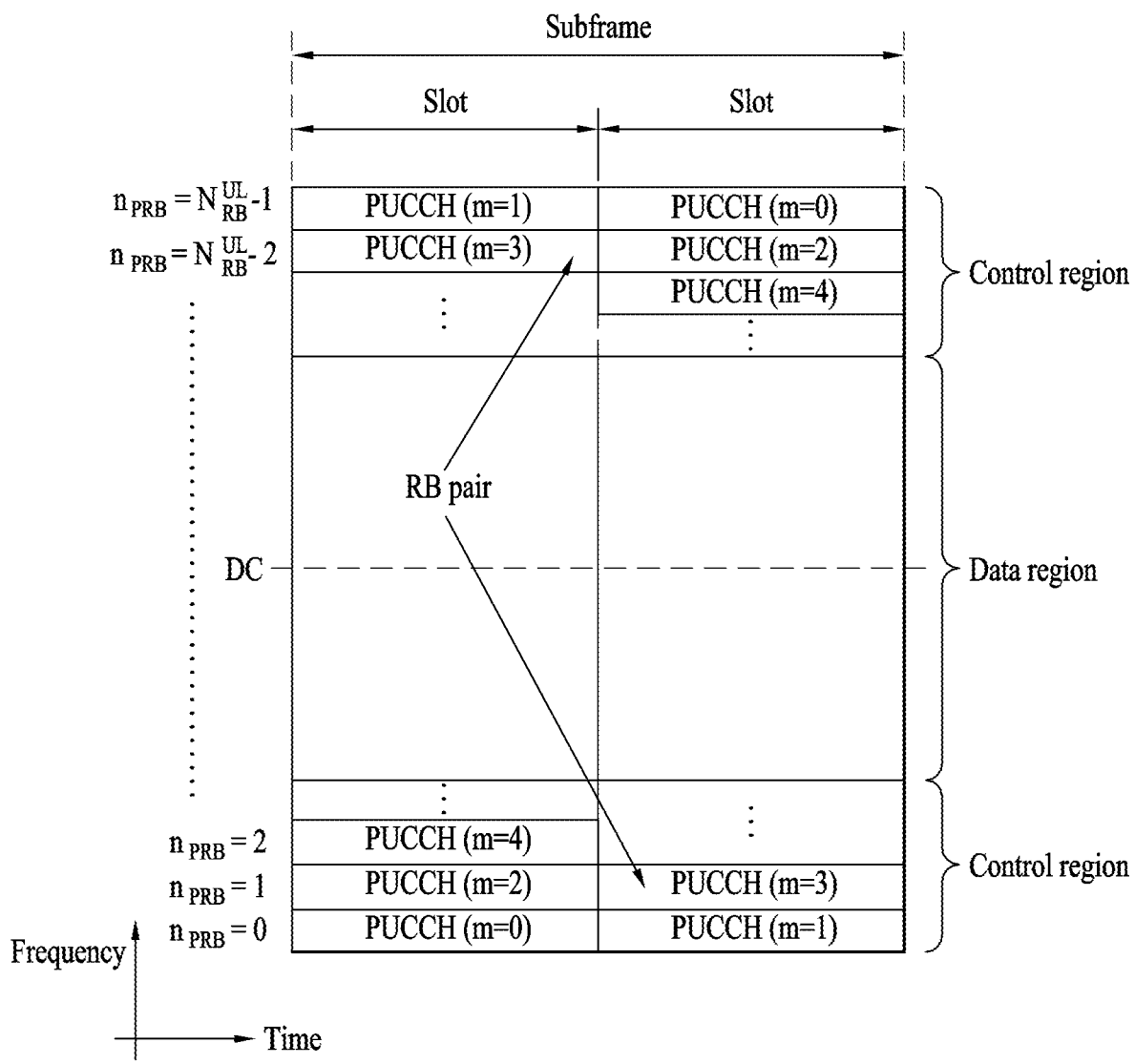
FIG. 4 illustrates an exemplary structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs in each of UL and DL are aggregated to support a BW of 60 MHz. The CCs may be contiguous or non-contiguous in the frequency domain. Although a case that a BW of UL CC and a BW of DL CC are the same and are symmetrical is described, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

A configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell.

For reference, a carrier indicator (CI) means a serving cell index ServCellIndex and CI=0 is applied to a Pcell. The serving cell index is a short identity used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present disclosure means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multicarrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling).

Figure 5:
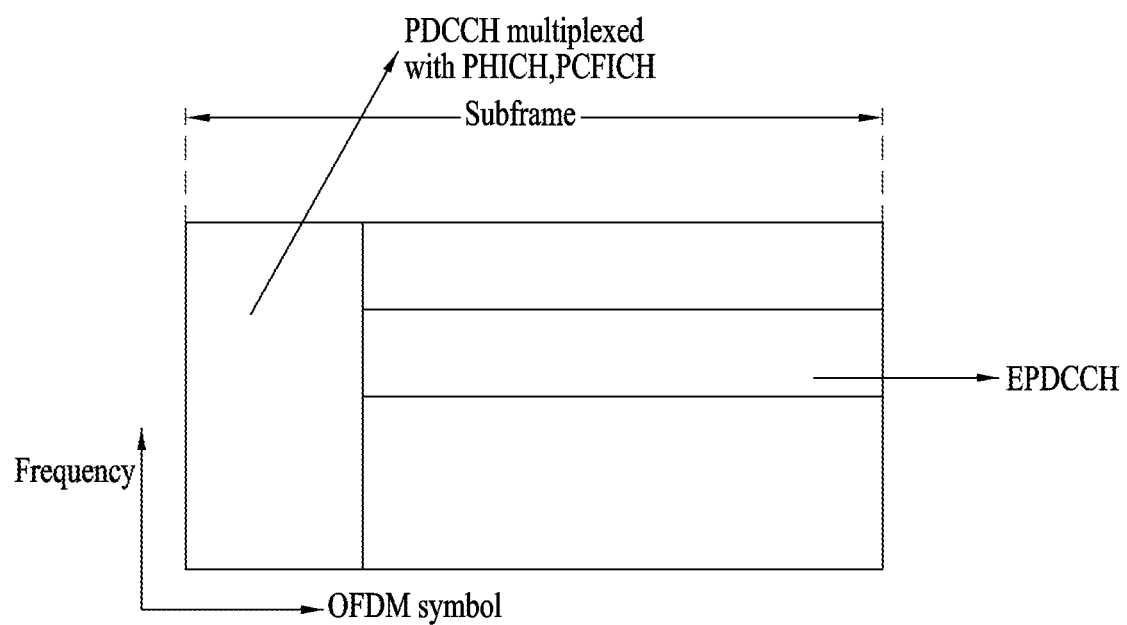
FIG. 5 illustrates an exemplary DL control channel configured in a data region of a DL subframe.

FIG. 5 is an example of a downlink control channel configured in a data region of a DL subframe.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107,108,109,110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{1,2,4,8,16,32\}$ is defined by a set of EPDCCH candidates.

For an EPDCCH-PRB-set p configured for distributed transmission, the ECCEs corresponding to EPDCCH candidate m of the search space $ES^{(L)}_k$ are given by the following table.

$$L\left\{\left(Y_{p,k} + \left\lfloor \frac{m \cdot N_{ECCE,p,k}}{L \cdot M^{(L)}_p} \right\rfloor + b\right) \mod \lfloor N_{ECCE,p,k}/L \rfloor\right\} + i \qquad \text{Equation 1}$$

where i=0, . . . , L−1. $b=n_{CI}$ if the UE is configured with a carrier indicator field for the serving cell on which EPDCCH is monitored, otherwise b=0. $n_{CI}$ is the carrier indicator field (CIF) value, which is the same as a serving cell index (ServCellIndex). m=0,1, . . . , $M^{(L)}_p-1$, $M^{(L)}_p$ is the number of EPDCCH candidates to monitor at aggregation level L in EPDCCH-PRB-set p. The variable $Y_{p,k}$ is defined by '$Y_{p,k}=(A_p \cdot Y_{p,k-1})$ mod D', where $Y_{p,k-1}=n_{RNTI} \neq 0$, $A_0=39827$, $A_0=39829$, D=65537 and k=floor($n_s/2$). $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 10, the number of EREGs per ECCE is given by Table 11. Table 10 shows an example of supported EPDCCH formats, and Table 11 shows an example of the number of EREGs per ECCE, $N^{EREG}_{ECCE}$. Both localized and distributed transmission is supported.

TABLE 10

Number of ECCEs for one EPDCCH, $N^{ECCE}_{EPDCCH}$

| EPDCCH | Case A | | Case B | |
|---|---|---|---|---|
| | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 11

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH can use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor (n/$N^{Sm}_{RB}$)+$jN^{ECCE}_{RB}$ in PRB indices (n+jmax(1,$N^{Sp}_{RB}/N^{EREG}_{ECCE}$))mod$N^{Sp}_{RB}$ for distributed mapping, where j=0,1, . . . , $N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 10 applies when:

DCI formats 2, 2A, 2B, 2C or 2D is used and $N^{DL}_{RB} \geq 25$, or any DCI format when $n_{EPDCCH} < 104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and and fulfilling all of the following criteria, they are part of any one of the 16 EREGs in the physical resource-block pair, they are assumed by the UE not to be used for CRSs or CSI-RSs, the index l in a subframe fulfills $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 12 with n'=$n_{ECCE,low}$ mod $N^{ECCE}_{RB}$+ $n_{RNTI}$ mod min($N^{ECCE}_{EPDCCH}, N^{ECCE}_{RB}$), where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 12

| | Normal cyclic prefix | | Extended cyclic prefix |
|---|---|---|---|
| n' | Normal subframes, Special subframes, configurations 3, 4, 8 | Special subframes, configurations 1, 2, 6, 7, 9 | Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner where p∈{107,109} for normal cyclic prefix and p∈{107,108} for extended cyclic prefix.

Hereinbelow, the PDCCH and the EPDCCH are collectively referred to as the PDCCH or the (E)PDCCH.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present disclosure proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, a PDCCH and/or a PDSCH may be transmitted in a plurality of (e.g., about 100) subframes to an MTC UE experiencing a coverage problem.

Embodiments of the present disclosure are also applicable to a new radio access technology (RAT) system in addition to the 3GPP LTE/LTE-A system. As more and more communication devices require a larger communication capacity, the need for enhanced mobile broadband communication, compared to the legacy RAT, is pressing. Further, massive MTC that interconnects a plurality of devices and things and thus provides them with various services irrespective of time and place is also one of important issues to be considered for future-generation communication. In addition, a communication system design in which services/UEs sensitive to reliability and latency are considered is under discussion. The introduction of a future-generation RAT in consideration of the enhanced mobile broadband communication, massive MTC, and ultra-reliable and low-latency communication (URLLC) is under discussion. For the convenience, the corresponding technology is referred to as a new RAT in the present disclosure.

In the system beyond the LTE-A system, a technique for reducing the latency of data transmission is considered. Packet data latency is one of performance metrics that vendors, operators, and end-users measure regularly (by a rate test application). Among all phases of the lifetime of a wireless access network system, a latency is measured in a new software release or system component phase, a system deployment phase, and a system commercialization phase.

Shorter latencies than in previous generations of 3GPP RATs were one performance metric that led to the design of LTE. LTE is now perceived to end-users as a system that provides faster access to the Internet and lower data latencies than previous generations of mobile radio technologies.

However, almost no improvements targeting particularly at delays in a system have been made. Packet data latency is a parameter that indirectly affects the throughput of the system as well as the perceived responsiveness of the system. Hypertext transfer protocol/transmission control protocol (HTTP/TCP) is a dominant application and transport layer protocol suite used on the Internet today. According to HTTP Archive (http://httparchive.org/trends.php), HTTP-based transactions over the internet are in a range of a few 10's of Kbytes to 1 Mbyte. In this size range, a TCP slow start period is a significant part of the total transport period of a packet stream. During the TCP slow start, the performance is limited by a latency. Hence, an improved latency may be readily presented to improve the average throughput for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in a UE and an eNB is to reduce a latency.

Radio resource efficiency may also be positively affected by latency reduction. A lower packet data latency may increase the number of transmission attempts possible within a certain delay bound. Hence, higher block error rate (BLER) targets may be used for data transmissions, freeing up radio resources but still keeping the same level of robustness for UEs in poor radio conditions. If the same BLER target is maintained, the increased number of possible transmissions within a certain delay bound may be interpreted as more robust transmissions of real-time data streams (e.g. voice over LTE (VoLTE)). This may improve the VoLTE voice system capacity.

There are a number of existing applications that may be positively affected by a reduced latency in terms of perceived quality of experience, such as gaming, real-time applications like VoLTE/over-the-top voice over Internet protocol (OTT VoIP), and video telephony/conferencing.

In the future, more and more new applications will be delay-critical. For example, delay may be a critical element to augmented reality applications in smart glasses or specific machine communications requiring a low latency as well as critical communication, and remote control/driving of vehicles.

In embodiments of the present disclosure, which will be described below, "assumes" may mean that an entity transmitting a channel transmits the channel in accordance with the corresponding "assumption" or that an entity receiving the channel receives or decodes the channel in the form conforming to the "assumption" on the premise that the channel has been transmitted according to the "assumption".

Figure 6:
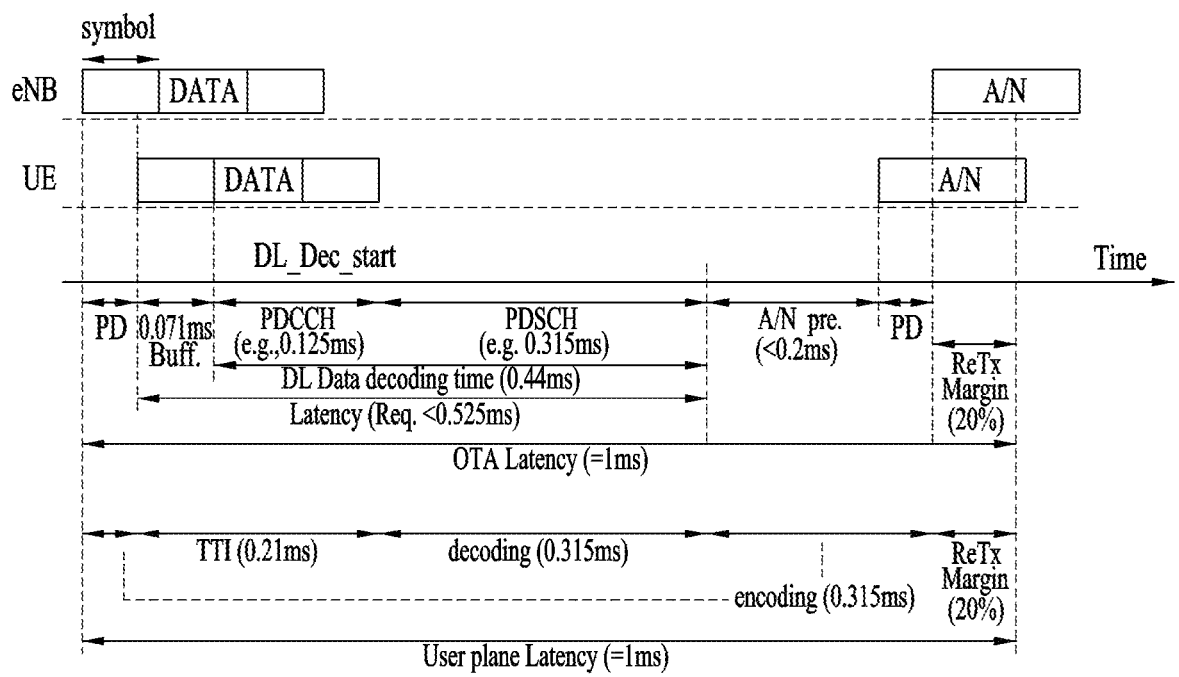
FIG. 6 illustrates an exemplary transmission time interval (TTI) length required to achieve a low latency.

FIG. 6 is an exemplary view illustrating a TTI length required to achieve a low latency.

Referring to FIG. 6, while a signal transmitted by an eNB reaches a UE, the UE transmits an A/N for the signal, and the A/N reaches the eNB, an over the air (OTA) latency occurs, which involves a DL propagation delay (PD), a buffering time, a decoding time, an A/N preparation time, a UL PD, and a retransmission margin. To satisfy a low latency, there is a need for newly designing a shortened TTI (sTTI) spanning 0.5 ms or shorter by shortening a minimum unit of data transmission, TTI. For example, if the OTA latency, which is a time period from the start of transmission of data (a PDCCH and a PDSCH) in the eNB to completion of transmission of an A/N for the data to the eNB in the UE, is to be reduced to or below 1 ms, the TTI is preferably set to 0.21 ms. That is, to reduce a user-plane (U-plane) latency to 1 ms, an sTTI may be configured in units of about three OFDM symbols.

While an sTTI is configured to include three OFDM symbols to decrease an OTA latency or a U-plane latency to 1 ms in FIG. 6, by way of example, an sTTI of a length shorter than 1 ms may also be configured. In the normal CP case, for example, there may be an sTTI with two OFDM symbols, an sTTI with four OFDM symbols, and/or an sTTI with seven OFDM symbols.

The total OFDM symbols of a TTI or the remaining OFDM symbols of the TTI except for OFDM symbols occupied by a PDCCH region in the TTI may be divided into two or more sTTIs in the time domain in the whole or a part of frequency resources of the TTI.

Hereinbelow, a default or main TTI used in the system will be referred to as a TTI or a subframe, and a TTI shorter than the default/main TTI of the system will be referred to as an sTTI. For example, a TTI having a time length shorter than 1 ms may be referred to as an sTTI in a system using the 1-ms TTI as a default TTI, like the LTE/LTE-A systems used up to now. Hereinbelow, a PDCCH/PDSCH/PUSCH/PUCCH transmitted in units of a default/main TTI is referred to as a PDCCH/PDSCH/PUSCH/PUCCH, and a PDCCH/PDSCH/PUSCH/PUCCH transmitted in an sTTI or in units of an sTTI is referred to as a shortened PDCCH/shortened PDSCH/ shortened PUSCH/ shortened PUCCH (sPDCCH/sPDSCH/sPUSCH/sPUCCH). Although a different default/main TTI from that of the current LTE/LTE-A system may be used in a new RAT environment due to the change of numerology, embodiments of the present disclosure will be described below on the assumption that the time length of the default/main TTI is 1 ms, the default/main TTI is referred to as a legacy TTI or subframe, and a TTI shorter than the 1-ms TTI is referred to as an sTTI. Methods for transmitting/receiving a signal in a TTI and an sTTI according to the following embodiments may be applied in the same manner to a default/main TTI and an sTTI in a system based on numerology for a new RAT environment as well as a system based on the current LTE/LTE-A numerology.

Figure 7:
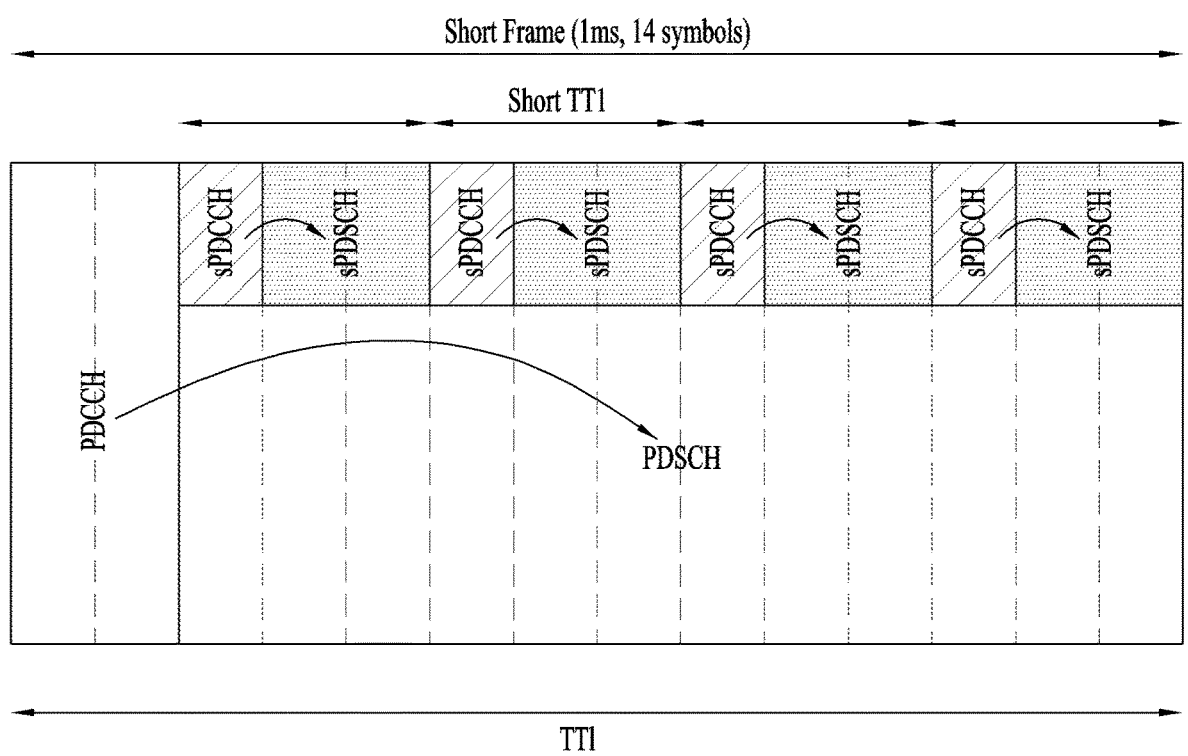
FIG. 7 illustrates an exemplary shortened TTI, and an exemplary transmission of a control channel and a data channel in the shortened TTI.

FIG. 7 illustrates an exemplary sTTI and an exemplary transmission of a control channel and a data channel in the sTTI.

In a DL environment, a PDCCH for data transmission/scheduling in an sTTI (i.e., an sPDCCH) and a PDSCH transmitted in an sTTI (i.e., an sPDSCH) may be transmitted. For example, referring to FIG. 7, a plurality of sTTIs may be configured with different OFDM symbols in one subframe. For example, OFDM symbols of a subframe may be divided into one or more sTTIs in the time domain. Leading OFDM symbols carrying legacy control channels may be excluded from the OFDM symbols included in the sTTIs. An sPDCCH and an sPDSCH may be transmitted in TDM, using different OFDM symbol regions in an sTTI. An sPDCCH and an sPDSCH may be transmitted in FDM, using different PRB regions/frequency resources in an sTTI.

For a UE which transmits and receives data in an sTTI to satisfy a low latency (hereinafter, referred to as a low latency radio or low latency reduction (LLR) UE), a proposal is made about whether the LLR UE needs to receive a legacy PDCCH/legacy PDSCH in addition to an sPDCCH, and if the LLR UE receives the legacy PDCCH/legacy PDSCH, what is to be considered. Further, a proposal is made about simultaneous reception of an sPDSCH and a legacy PDSCH.

Hereinbelow, monitoring a PDCCH CSS/USS for reception of broadcast data or unicast data means monitoring a PDCCH which schedules the broadcast data or a PDCCH which schedules the unicast data in the PDCCH CSS/USS.

A. PDCCH CSS Monitoring

This section proposes about PDCCH CSS monitoring for an LLR UE.

Alt1. PDCCH CSS monitoring only for broadcast data

The LLR UE may monitor a PDCCH CSS only for reception of broadcast data (e.g., a SIB, a random access response (RAR), or a paging message). That is, the UE may monitor only a PDCCH scrambled with an SI-RNTI, an RA-RNTI, or a P-RNTI in the PDCCH CSS, without monitoring a PDCCH scrambled with a C-RNTI in the PDCCH CSS.

The LLR UE may monitor a PDCCH CSS for reception of broadcast data, and monitor a PDCCH USS and/or an sPDCCH USS for reception of unicast data. In this case, the broadcast data may be scheduled in the PDCCH CSS and transmitted on a legacy PDSCH, and the unicast data may be scheduled in the sPDCCH USS and transmitted on an sPDSCH and/or scheduled in the PDCCH USS and transmitted on the legacy PDSCH.

Alt2. PDCCH CSS monitoring for broadcast/unicast data

The LLR UE may monitor a PDCCH CSS for reception of broadcast data (e.g., a SIB, an RAR, or a paging message) and reception of unicast data. That is, the UE may monitor PDCCHs scrambled with an SI-RNTI, an RA-RNTI, a P-RNTI, and a C-RNTI in the PDCCH CSS.

The LLR UE may monitor a PDCCH CSS for reception of broadcast data, and unicast data for an RRC signal or the like, and monitor a PDCCH USS and/or an sPDCCH USS for reception of unicast data.

If the UE monitors the PDCCH CSS for reception of unicast data as well as broadcast data, simultaneous monitoring of the PDCCH CSS and the sPDCCH USS may increase complexity. Therefore, the UE may monitor a PDCCH scrambled with a C-RNTI in the PDCCH CSS, periodically only in a specific time domain, in order to decrease the overhead of monitoring the PDCCH CSS. For this purpose, information about the position of a subframe in which a PDCCH scrambled with a C-RNTI is monitored in a PDCCH CSS may be defined (in a standard specification) or configured for the UE in an SIB, an RRC signal, or the like by an eNB. For example, a monitoring period, an offset being information indicating a starting subframe in which the UE is to start monitoring, and/or a duration being the number of (consecutive) subframes that the UE is to monitor in each monitoring period may be given as the information about the subframe position. The offset may be a value indicating the difference between a reference subframe (e.g., subframe #0) and the starting subframe.

B. PDCCH USS Monitoring

This section proposes about PDCCH USS monitoring for an LLR UE.

Alt 1. No PDCCH USS monitoring during sPDCCH monitoring.

Simultaneous monitoring of an sPDCCH USS and a legacy PDCCH USS at the LLR UE may cause large overhead. To reduce this UE complexity, the LLR UE may not monitor the legacy PDCCH USS during monitoring the sPDCCH USS. In this case, the UE may receive an sPDCCH for unicast data in the sPDCCH USS, and may also receive a PDCCH for reception of unicast data in a PDCCH CSS to receive an RRC signal or the like. Or the UE may receive an sPDCCH for unicast data in the sPDCCH USS, and receive only a PDCCH for broadcast data in the PDCCH CSS.

The UE may monitor an sPDCCH USS without monitoring a PDCCH USS at the following time points.

Option 1. If the UE supports data transmission/reception in an sTTI and a cell providing a service to the UE supports data transmission/reception in an sTTI, the UE may always monitor the sPDCCH USS without monitoring the PDCCH USS.

Option 2. If the UE receives a configuration indicating data transmission/reception in an sTTI from the eNB, the UE may monitor the sPDCCH USS without monitoring the PDCCH USS. Herein, the UE may receive the configuration indicating data transmission/reception in an sTTI from the eNB by an RRC signal.

Option 3. The UE may monitor the sPDCCH USS in an sTTI in a specific time domain, and monitor a PDCCH for data transmission/reception in the PDCCH USS in the remaining time domains. For this purpose, information about a time period for PDCCH USS monitoring of the UE or information about a time period for sPDCCH USS monitoring of the UE may be defined (in a standard specification) or configured in an SIB, an RRC signal, or the like by the eNB. The information about the time period for monitoring of the UE may specify a monitoring period, an offset, and/or a duration.

Option 4. For the UE, the eNB may configure a channel (e.g., a PDCCH or an sPDCCH) on which the UE is supposed to monitor a USS. For example, the eNB may transmit information indicating a channel (e.g., a PDCCH or an sPDCCH) to be monitored by the UE. This configuration information may be transmitted by an RRC signal. The UE may monitor the PDCCH USS or the sPDCCH USS according to the configuration information received from the eNB.

Alt 2. PDCCH USS monitoring during sPDCCH monitoring.

For scheduling flexibility of the eNB, the LLR UE may monitor the PDCCH USS even during monitoring the sPDCCH USS.

In this case, it is preferred to reduce the number of BDs in the sPDCCH USS and/or the PDCCH USS in order to reduce the BD overhead of the UE.

Meanwhile, the UE may monitor the PDCCH USS periodically only in a specific time domain in order to reduce the monitoring overhead of the UE. For this purpose, information about a subframe position at which the PDCCH USS is to be monitored may be defined (in a standard specification) or configured in an SIB, an RRC signal, or the like by the eNB. A monitoring period, an offset, and/or a duration may be given as the information about the subframe position at which the UE is supposed to monitor.

In the case where a UE supporting data transmission/reception in an sTTI performs data transmission/reception in an sTTI, the following control channels may schedule a data channel transmitted in an sTTI and a data channel (i.e., a PDSCH and/or a PUSCH) transmitted in a TTI (e.g., a legacy TTI). Herein, these data channels may be limited to unicast data channels.

Case A: A data channel transmitted in an sTTI is scheduled by an sPDCCH, and a data channel transmitted in a TTI is scheduled by an (E)PDCCH.

Case B: An sPDSCH transmitted in the first sTTI of a subframe, that is, in an sTTI at the start of the subframe on the time axis is scheduled by a PDCCH, and sPDSCHs transmitted in the remaining sTTIs are scheduled by sPDCCHs. A data channel transmitted in a TTI is scheduled by an (E)PDCCH. That is, the PDCCH performs data scheduling in some sTTI, and the sPDCCHs perform data scheduling in the remaining sTTIs.

Case C: Both of a data channel transmitted in an sTTI and a data channel in a TTI may be scheduled by sPDCCHs. Herein, the data channel transmitted in the TTI may be scheduled by an sPDCCH transmitted in the first sTTI. Or the data channel transmitted in the TTI may be scheduled by every sPDCCH transmitted in a subframe.

Herein, data channels transmitted in an sTTI and a TTI may be scheduled in the following methods. The following proposals may be limited to scheduling of unicast data.

Method 1. Scheduling Always in sTTI.

A UE, which performs data transmission/reception in an sTTI, may always transmit/receive a data channel in an sTTI. That is, the UE may assume that a data channel is scheduled only in an sTTI, not in a TTI.

Method 2. Semi-Static Configuration of Scheduling in sTTI or Scheduling in TTI/Time Duplex Multiplexing (TDM).

For a UE which performs data transmission/reception in an sTTI, information indicating whether data transmission/reception is to be performed in an sTTI or a TTI may be configured for the UE by higher-layer signaling such as an SIB, an RRC signal, or the like. Or data transmission/reception may be performed in TDM in an sTTI or a TTI according to information about a time period for data transmission/reception in the sTTI and a time period for data transmission/reception in the TTI. The information about a time period for data transmission/reception in the sTTI and a time period for data transmission/reception in the TTI may be defined (in a standard specification) or configured in an SIB, an RRC signal, or the like by the eNB. This configuration may specify a monitoring period, an offset, and/or a duration, for data transmission/reception.

Method 3. Dynamic Configuration of Scheduling in sTTI or Scheduling in TTI.

For a UE which performs data transmission/reception in an sTTI, information indicating whether data transmission/reception is to be performed in an sTTI or a TTI may be configured dynamically for the UE in units of one or more subframes by a physical layer channel/signal. Information indicating whether data transmission/reception is to be performed in an sTTI or a TTI in a corresponding subframe may be configured for the UE by a PDCCH. Or information indicating whether data transmission/reception is to be performed in an sTTI or a TTI in a next subframe may be configured for the UE by a PDCCH. Or an indication indicating whether data transmission/reception is to be performed in an sTTI or a TTI is transmitted on a PDCCH. The PDCCH including this indication is referred to as a PDCCH_STTI_ind and the indication carried by the PDCCH_STTI_ind may be applied, starting from a subframe to which the indication is applied until before a subframe to which a next transmitted PDCCH_STTI_ind is applied.

Method 4. Blind Detection of Scheduling in sTTI and Scheduling in TTI.

Whether data transmission/reception is to be performed in an sTTI or a TTI may be determined dynamically without an additional indication. Or data transmission/reception may be performed simultaneously in an sTTI and a TTI. In this case, the UE should perform BD on the assumption that both of data scheduling in an sTTI and data scheduling in a TTI are possible. The UE may distinguish DCI which schedules data in an sTTI from DCI which schedules data in a TTI in the following methods.

Option 1. Differentiation by SSs.

DCI which schedules data transmitted in an sTTI and DCI which schedules data transmitted in a TTI may be transmitted in separate SSs. For example, the DCI which schedules data transmitted in a TTI may be transmitted in a legacy PDCCH (CSS/USS) or an EPDCCH USS, whereas the DCI which schedules data transmitted in an sTTI may be transmitted in an sPDCCH USS. The sPDCCH USS will be described below.

1-1) An sPDCCH USS may exist in an sTTI. For example, DCI which schedules an sPDSCH transmitted in an sTTI may be transmitted in an sPDCCH USS existing in the same sTTI.

1-2) DCI which schedules sPDSCHs transmitted in the remaining sTTIs except for the first sTTI may be transmitted in an sPDCCH USs existing in the same sTTI, and DCI which schedules an sPDSCH transmitted in the first sTTI may be transmitted in an sPDCCH USS existing in a legacy PDCCH OFDM symbol domain. A first sPDCCH USS may be an sPDCCH USS at the start of a subframe on the time axis. The first sPDCCH USS may exist in the legacy PDCCH OFDM symbol region.

1-3) DCI which schedules sPDSCHs transmitted in the remaining sTTIs except for the first sTTI may be transmitted in an sPDCCH USS existing in the same sTTI, and DCI which schedules an sPDSCH transmitted in the first sTTI may be transmitted in a CSS. This method may be applied to a case where the UE does not monitor a CSS in a subframe available for data scheduling in an sTTI.

If Method 1-1) or Method 1-2) is used, the number of decoding candidates that the UE monitors in a PDCCH USS and the number of decoding candidates that the UE monitors in an sPDCCH USS may be determined, so that the number of BDs for monitoring the PDCCH USS and the number of BDs for monitoring the SPDCCH USS may be divided from a predetermined number (e.g., 16*2=32 in total according to Table 9).

Or the UE may not monitor a CSS in a subframe available for data scheduling in an sTTI. In this case, the predetermined number of BDs (e.g., 6*2=12 in total according to Table 9) for monitoring the CSS may be used for monitoring an sPDCCH USS. That is, up to 12 decoding candidates (i.e., sPDCCH candidates) may exist in the sPDCCH USS.

Option 2. Differentiation by DCI Formats.

Option 2 is applicable, particularly to Case B or Case C. In Case B where both of DCI which schedules data transmitted in an sTTI (e.g., an sPDSCH) and DCI which schedules data transmitted in a TTI (e.g., a PDSCH) may be transmitted in a PDCCH USS or in Case C where DCI which schedules data transmitted in an sTTI and DCI which schedules data transmitted in a TTI may be transmitted in an sPDCCH SS, there is a need for distinguishing the DCI which schedules data transmitted in an sTTI from the DCI which schedules data transmitted in a TTI. Only if whether DCI carrying a PDCCH/sPDCCH is for a TTI or an sTTI is determined, it may be determined whether data is to be transmitted/received in a TTI range or an sTTI range. For this purpose, it may be defined that the DCI which schedules data transmitted in an sTTI and the DCI which schedules data transmitted in a TTI have different DCI formats. It may be defined that the DCI which schedules data transmitted in an sTTI and the DCI which schedules data transmitted in a TTI have different DCI sizes.

Option 3: Differentiation by Scrambling.

Option 3 is applicable, particularly to Case B or Case C. In Case B where both of DCI which schedules data transmitted in an sTTI (e.g., an sPDSCH) and DCI which schedules data transmitted in a TTI (e.g., a PDSCH) may be transmitted in a PDCCH USS or in Case C where DCI which schedules data transmitted in an sTTI and DCI which schedules data transmitted in a TTI may be transmitted in an sPDCCH SS, there is a need for distinguishing the DCI which schedules data transmitted in an sTTI from the DCI which schedules data transmitted in a TTI. For this purpose, different scrambling may be applied to the DCI which schedules data transmitted in an sTTI and the DCI which schedules data transmitted in a TTI.

3-1) Scrambling with different RNTIs may be applied to the DCI which schedules data transmitted in an sTTI and the DCI which schedules data transmitted in a TTI. For example, the UE may have two C-RNTIs, and monitor the DCI which schedules data transmitted in an sTTI with one C-RNTI and monitor the DCI which schedules data transmitted in a TTI with the other C-RNTI. Herein, the two C-RNTIs may be configured independently of each other. Or the eNB may configured one C-RNTI for the UE, and the UE may assume that the DCI which schedules data transmitted in a TTI is scrambled with the C-RNTI, and the DCI which schedules data transmitted in an sTTI is scrambled with C-RNTI' (=C-RNTI+$\alpha$).

3-2) Additional scrambling may be applied to the DCI which schedules data transmitted in an sTTI, compared to the DCI which schedules data transmitted in a TTI. For example, if the DCI which schedules data transmitted in a TTI is scrambled with scrambling sequence A, the DCI which schedules data transmitted in an sTTI may be scrambled with scrambling sequence A and additionally with scrambling sequence B.

Option 4: Differentiation by Decoding Candidates.

Option 4 is applicable, particularly to Case B or Case C. In Case B where both of DCI which schedules data transmitted in an sTTI (e.g., an sPDSCH) and DCI which schedules data transmitted in a TTI (e.g., a PDSCH) may be transmitted in a PDCCH USS or in Case C where DCI which schedules data transmitted in an sTTI and DCI which schedules data transmitted in a TTI may be transmitted in an sPDCCH SS, there is a need for distinguishing the DCI which schedules data transmitted in an sTTI from the DCI which schedules data transmitted in a TTI. For this purpose, the DCI which schedules data transmitted in an sTTI and the DCI which schedules data transmitted in a TTI may be transmitted in different decoding candidates (e.g., PDCCH candidates or sPDCCH candidates).

For example, given N decoding candidates in total in a USS, the DCI which schedules data transmitted in an sTTI may be transmitted in decoding candidate 0 to decoding candidate 'N/2−1', and the DCI which schedules data transmitted in a TTI may be transmitted in decoding candidate 'N/2' to decoding candidate 'N−1'. In another example, given N_L decoding candidates for each AL 'L', the DCI which schedules data transmitted in an sTTI may be transmitted in decoding candidate 0 to decoding candidate 'N_L/2−1', and the DCI which schedules data transmitted in a TTI may be transmitted in decoding candidate 'N_L/2' to decoding candidate 'N_L−1'.

Or the DCI which schedules data transmitted in an sTTI and the DCI which schedules data transmitted in a TTI may be transmitted in decoding candidates having different ALs. The DCI which schedules data transmitted in an sTTI may be transmitted in decoding candidates having AL 1 and AL 2, and the DCI which schedules data transmitted in a TTI may be transmitted in decoding candidates having AL 4 and AL 8.

Decoding candidates carrying DCI which schedules data transmitted in an sTTI, and decoding candidates carrying DCI which schedules data transmitted in a TTI may be defined (in a standard specification) or semi-statically configured for the UE in an SIB/RRC signal or the like by the eNB. Herein, the UE may attempt to decode the decoding candidates carrying the DCI which schedules data transmitted in an sTTI, before the decoding candidates carrying the DCI which schedules data transmitted in a TTI.

C. Simultaneous Reception of PDSCH and sPDSCH in Subframe

In the case where the LLR UE monitors a PDCCH and an sPDCCH simultaneously (in the same subframe), data may be scheduled for the UE simultaneously by the PDCCH and the sPDCCH. In Section C, a proposal is made about what DCI is transmitted simultaneously to a UE and thus what data channels may be transmitted/transmitted and received simultaneously.

Broadcast PDSCH and (Unicast) sPDSCH

For the LLR UE, a PDCCH that schedules a broadcast PDSCH (e.g., an SIB, an RAR, or a paging message) and a unicast sPDSCH may be scheduled simultaneously in a PDCCH CSS and an sPDCCH USS, respectively, in a specific subframe. In this case, the UE may receive both of the broadcast PDSCH and the unicast sPDSCH in the same subframe, determining that the two pieces of scheduling information are valid.

Unicast PDSCH and (Unicast) sPDSCH

Figure 8:
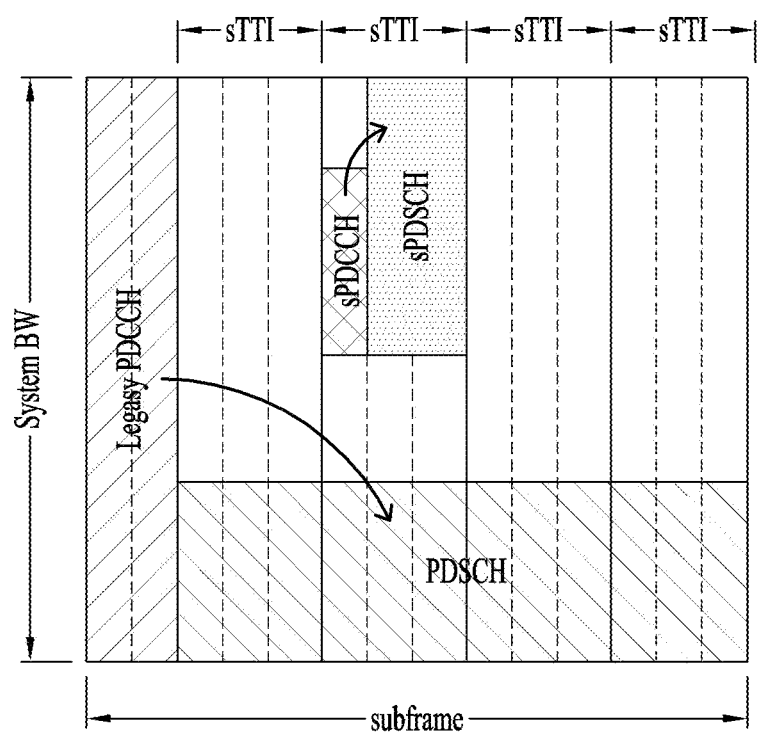
FIG. 8 illustrates an exemplary scheduling of a physical downlink shared channel (PDSCH) and a shortened PDSCH (sPDSCH) according to an embodiment of the present disclosure.

FIG. 8 illustrates an exemplary scheduling of a PDSCH and sPDSCHs according to an embodiment of the present disclosure.

As illustrated in FIG. 8, the LLR UE is likely to receive a PDCCH which schedules a unicast PDSCH in a PDCCH CSS or a PDCCH USS, and an sPDCCH which schedules a unicast sPDSCH in an sPDCCH USS in a specific subframe.

The present disclosure proposes that reception of a unicast PDSCH and a unicast sPDSCH in the same subframe is not supported. That is, the UE may assume that a unicast PDSCH and a unicast sPDSCH are not scheduled in the same subframe. If the UE receives a PDCCH which schedules a unicast PDSCH and an sPDCCH which schedules a unicast sPDSCH at the same time, the UE may not receive the PDSCH by dropping the PDCCH which schedules the unicast PDSCH, determining that only the sPDCCH which schedules the unicast sPDSCH is valid.

Or the present disclosure proposes that reception of a unicast PDSCH and a unicast sPDSCH in the same subframe is supported. That is, the UE may assume that a unicast PDSCH and a unicast sPDSCH may be scheduled in the same subframe. In this case, the UE may receive unicast data on the sPDSCH without a latency during reception of a message such as an RRC signal or the like on the PDSCH from the eNB.

To receive the unicast PDSCH and the unicast sPDSCH in the same subframe, the UE should monitor the sPDCCH in the subframe carrying the unicast PDSCH. In this case, it may occur that resources carrying the unicast PDSCH overlap with resources in which the UE monitors the sPDCCH. In the presence of a PDSCH scheduled in a long TTI or a longer TTI, this phenomenon also occurs when reception of a control channel is attempted in a control region of a short TTI. Or in the case where the PDSCH is transmitted across a plurality of short TTIs, this phenomenon may also occur when a control signal is monitored on a short TTI basis. In this case, the UE may receive the sPDCCH and the PDSCH in the following manner. Although the following proposed methods are about reception of an sPDCCH and a PDSCH, these proposals may also be applied in the same principle to reception of a control channel transmitted in a short (or shorter) TTI and a data channel transmitted in a long (longer) TTI or a plurality of sTTIs. In this case, an sPDCCH may be the control channel transmitted in a short (shorter) TTI, and a PDSCH may be the data channel transmitted in a long (longer) TTI or a plurality of sTTIs in the following proposals.

Alt 1. Priority is given to sPDCCH monitoring.

If a PDSCH transmission region and an sPDCCH monitoring region are overlapped, the UE may give priority to reception of an sPDCCH which schedules delay-sensitive data over reception of a PDSCH. In this case, the UE may monitor the sPDCCH without considering the PDSCH, assuming that the sPDCCH is also transmitted in resources carrying the PDSCH. In this case, the PDSCH may be received as follows.

Option 1. The UE may assume that the PDSCH is rate-matched or punctured in a PDSCH-receiving PRB region overlapped with the sPDCCH monitoring resources. Or the UE may assume that the PDSCH is rate-matched or punctured in an OFDM symbol region of an sTTI in which the sPDCCH is monitored (or OFDM symbols in which the sPDCCH is monitored) within the PDSCH-receiving PRB region overlapped with the sPDCCH monitoring resources. Accordingly, the UE may receive the PDSCH in the remaining regions.

Figure 9:
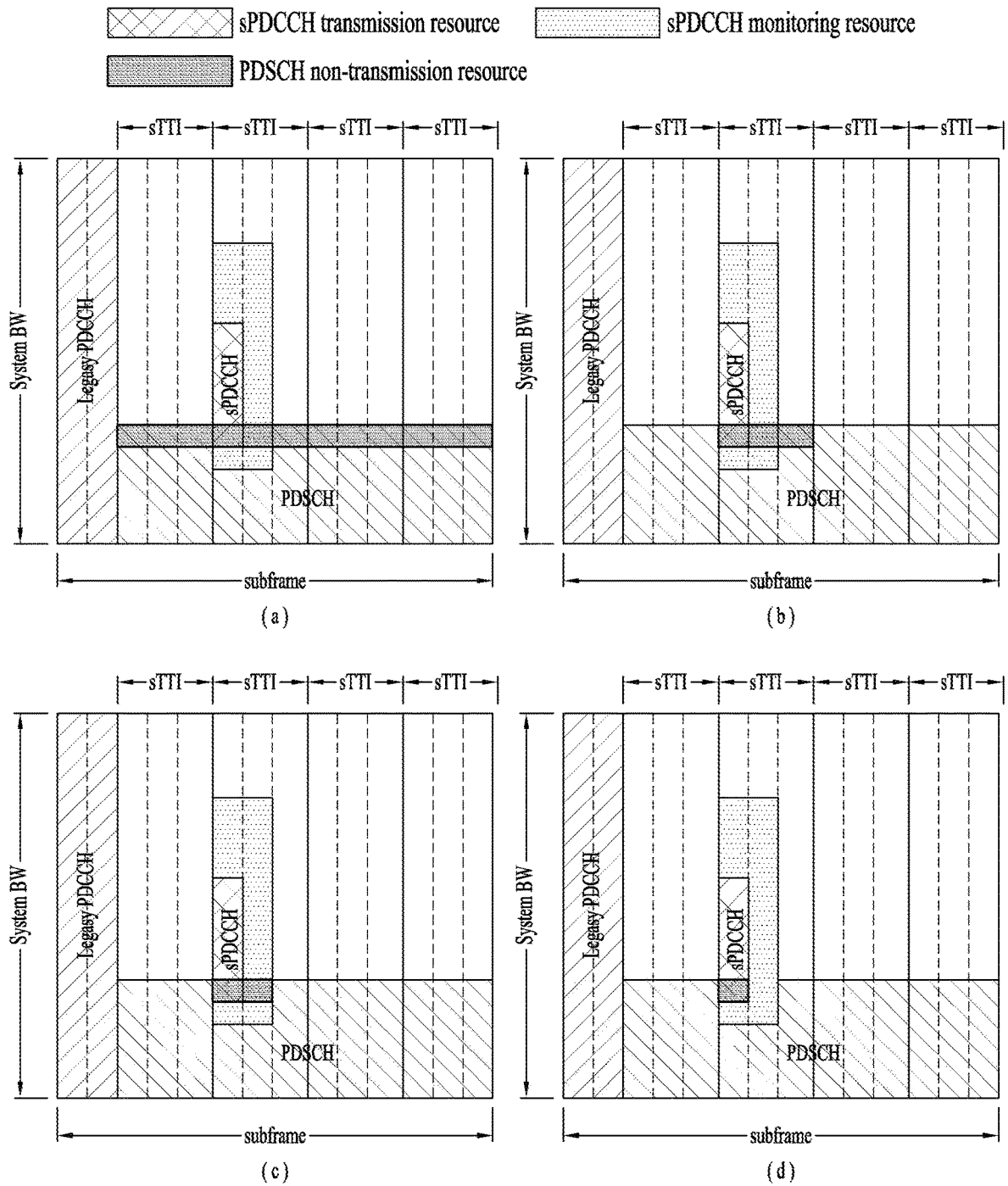
FIG. 9 illustrates exemplary user equipment (UE) operations in the case of collision between a PDSCH and an sPDSCH according to embodiments of the present disclosure.

Option 2. FIG. 9 illustrates exemplary UE operations in the case of collision between a PDSCH and an sPDCCH according to embodiments of the present disclosure. Upon receipt of an sPDCCH directed to the UE as a result of sPDCCH monitoring, the UE may assume that a PDSCH is rate-matched or punctured in a PDSCH-receiving PRB region overlapped with resources carrying the sPDCCH, as illustrated in FIG. 9(a). If the sPDCCH region is reserved cell-commonly, the UE may assume rate-matching or puncturing irrespective of detection of the control channel directed to the UE. However, if the sPDCCH region is a UE-specific region or a non-reserved region, the UE may assume rate-matching or puncturing only when the control channel is detected. This operation may be applied to all options presented in Alt 1 of Section C. Or upon receipt of an sPDCCH directed to the UE as a result of sPDCCH monitoring, the UE may assume that a PDSCH is rate-matched or punctured in an OFDM symbol region of an sTTI carrying the sPDCCH within a PDSCH-receiving PRB region overlapped with resources carrying the sPDCCH, as illustrated in FIG. 9(b). Or upon receipt of an sPDCCH directed to the UE as a result of sPDCCH monitoring, the UE may assume that a PDSCH is rate-matched or punctured in an OFDM symbol region in which the sPDCCH is monitored within a PDSCH-receiving PRB region overlapped with resources carrying the sPDCCH, as illustrated in FIG. 9(c). Or upon receipt of an sPDCCH directed to the UE as a result of sPDCCH monitoring, the UE may assume that a PDSCH is rate-matched or punctured in an OFDM symbol region carrying the sPDCCH within a PDSCH-receiving PRB region overlapped with resources carrying the sPDCCH, as illustrated in FIG. 9(d). Accordingly, the UE may receive the PDSCH in the remaining regions.

The sPDCCH may include only a DL grant and/or a UL grant.

Option 3. Upon receipt of an sPDCCH directed to the UE as a result of sPDCCH monitoring, the UE may assume that a PDSCH is rate-matched or punctured in RE resources carrying the sPDCCH. Accordingly, the UE may receive the PDSCH in the remaining regions. The sPDCCH may include only a DL grant and/or a UL grant.

Option 4. A 'non-PDSCH transmission PRB region' may be defined (in a standard specification) or configured for the UE in an SIB/RRC signal by the eNB. Or this PRB region may be configured dynamically by DCI which schedules a PDSCH or other DCI. This PRB region may be identical to an sPDCCH-PRB-PRB-set region. In the presence of a plurality of sPDCCH-PRB-sets, this PRB region may be identical to one or more sPDCCH-PRB-set regions.

In the case where when the UE receives a PDSCH, this PRB region overlaps with a PDSCH transmission region, the UE may assume that the PDSCH is not transmitted but punctured or rate-matched in this PRB region. Or in the case where when the UE receives a PDSCH, this PRB region overlaps with a PDSCH transmission region, the UE may assume that the PDSCH is rate-matched or punctured in an OFDM symbol region for sPDCCH monitoring or an OFDM symbol region of an sTTI within the PRB region. Or considering that the 'non-PDSCH transmission PRB region' may be different according to an sTTI, the UE may assume that the PDSCH is rate-matched or punctured in a 'non-PDSCH transmission PRB region' in each sTTI, or a 'non-PDSCH transmission PRB region' within sPDCCH-monitoring OFDM symbols in each sTTI.

Additionally, upon detection of a DL grant and/or a UL grant directed to the UE outside the 'non-PDSCH transmission PRB region', the UE may receive a PDSCH in the corresponding PRB region by giving priority to sPDCCH transmission in Option 2 to Option 3 of Alt 1 in Section C. Or, additionally, upon detection of a DL grant and/or a UL grant directed to the UE outside the 'non-PDSCH transmission PRB region', the UE may receive a PDSCH in the corresponding PRB region by giving priority to PDSCH transmission in Option 1 to Option 2 of Alt 2 in Section C.

Alt 2. Priority is given to PDSCH reception.

In the case where a PDSCH transmission region overlaps with an sPDCCH monitoring region, the UE may give priority to PDSCH reception over sPDCCH reception. In this case, the UE may monitor an sPDCCH, assuming that the sPDCCH is not transmitted in PDSCH transmission resources. In this case, the sPDCCH may be received as follows.

Option 1. The UE may not monitor sPDCCH candidates, assuming that the sPDCCH is not transmitted in the sPDCCH candidates configured using PRB resources or RE resources carrying the PDSCH.

Option 2. The UE may assume that in sPDCCH candidates configured using PRB resources or RE resources carrying the PDSCH, the sPDCCH is rate-matched or punctured in the PRB resources or RE resources.

If a unicast PDSCH and a unicast sPDSCH are received in the same subframe, the transmission resources of the scheduled PDSCH and sPDSCH may overlap with each other. Or a PDSCH scheduled in a long TTI may collide with an sPDSCH. Or if a PDSCH is allocated across a plurality of TTIs, an sPDSCH may be scheduled in the middle of the plurality of TTIs or in a subset of the plurality of TTIs, and the PDSCH allocated across the plurality of TTIs may overlap with the sPDSCH. In this case, the UE may receive the sPDSCH and the PDSCH as follows. While the following proposals are made about reception of an sPDSCH and a PDSCH, these proposals are also applicable in the same principle to a case where a data channel transmitted in a short (shorter) TTI and a data channel transmitted in a long (longer) TTI and/or a plurality of sTTIs. In this case, an sPDSCH may be the data channel transmitted in a short (shorter) TTI, and a PDSCH may be the data channel transmitted in a long (longer) TTI and/or a plurality of sTTIs in the following proposals.

Alt A. Priority is given to sPDSCH reception.

If a PDSCH transmission region overlaps with an sPDSCH transmission region, the UE may give priority to delay-critical sPDSCH reception over PDSCH reception. In this case, the UE may receive an sPDSCH, assuming that a PDSCH is not transmitted in sPDSCH transmission resources. In this case, the PDSCH may be received as follows.

Option 1. The UE may drop reception of the PDSCH, and determine that the PDSCH reception has been failed. In this case, the UE may transmit a NACK for the PDSCH reception to the eNB. Or the UE may determine that a DL grant which schedules the PDSCH is not valid. In this case, the UE may not transmit ACK/NACK information for the PDSCH.

Option 2. The UE may assume that the PDSCH is rate-matched or punctured in an OFDM symbol region of an sTTI carrying the sPDSCH within a PDSCH-receiving PRB region overlapped with the sPDSCH transmission resources. Thus, the UE may receive the PDSCH in the remaining regions.

Option 3. The UE may assume that the PDSCH is rate-matched or punctured in the PDSCH-receiving PRB region overlapped with the sPDSCH transmission resources. Thus, the UE may receive the PDSCH in the remaining regions.

Option 4. The UE may assume that the PDSCH is rate-matched or punctured in RE resources carrying the sPDSCH. Thus, the UE may receive the PDSCH in the remaining regions.

Alt B. Priority is given to PDSCH reception.

If a PDSCH transmission region overlaps with an sPDSCH transmission region, the UE may give priority to current reception of a PDSCH over sPDSCH reception. In this case, the UE may receive an sPDSCH, assuming that the sPDSCH is not transmitted in PDSCH transmission resources. In this case, the sPDSCH may be received as follows.

Option 1. The UE may drop reception of the sPDSCH, and determine that the sPDSCH reception has been failed. In this case, the UE may transmit a NACK for the sPDSCH reception to the eNB. Or the UE may determine that a DL grant which schedules the sPDSCH is not valid. In this case, the UE may not transmit ACK/NACK information for the sPDSCH.

Option 2. The UE may assume that the sPDSCH is rate-matched or punctured in PRB resources carrying the PDSCH. Thus, the UE may receive the sPDSCH in the remaining regions.

Option 3. The UE may assume that the sPDSCH is rate-matched or punctured in an sPDSCH-receiving PRB region within an sTTI, overlapped with the PDSCH transmission resources. Thus, the UE may receive the sPDSCH in the remaining regions.

Option 4. The UE may assume that the sPDSCH is rate-matched or punctured in RE resources carrying the PDSCH. Thus, the UE may receive the sPDSCH in the remaining regions.

The embodiments of Alt A and Alt B may also be applied to a case where a broadcast/unicast PDSCH collides with a broadcast/unicast sPDSCH.

PUSCH and sPUSCH

The LLR UE is likely to simultaneously receive a PDCCH which schedules a PUSCH in a PDCCH CSS or a PDCCH USS, and an sPDCCH which schedules an sPUSCH in an sPDCCH USS, in a specific subframe. Herein, the sPUCCH means a PUSCH transmitted in an sTTI.

In this case, the present disclosure proposes that transmission of a PUSCH and an sPUSCH in the same subframe is not supported. That is, the UE may assume that a PUSCH and an sPUSCH are not scheduled in the same subframe.

If the UE receives a PDCCH which schedules a PUSCH and an sPDCCH which schedules an sPUSCH at the same time, the UE may not receive the PUSCH by dropping the PDCCH which schedules the PUSCH, determining that only the sPDCCH which schedules the sPUSCH is valid.

PUSCH and sPDSCH

The LLR UE is likely to simultaneously receive a PDCCH which schedules a PUSCH in a PDCCH CSS or a PDCCH USS, and an sPDCCH which schedules an sPDSCH in an sPDCCH USS, in a specific subframe.

A main reason for the LLR UE to monitor a legacy PDCCH during data transmission/reception in an sTTI may be to receive broadcast data or an RRC signal. Therefore, the UE may not need to transmit a UL signal on a legacy PUSCH during data transmission/reception in an sTTI.

Therefore, the present disclosure proposes that a PUSCH and an sPDSCH are not scheduled in the same subframe. That is, the UE may assume that a PUSCH and an sPDSCH are not scheduled in the same subframe.

PDSCH and sPUSCH

The LLR UE is likely to simultaneously receive a PDCCH which schedules a PDSCH in a PDCCH CSS or a PDCCH USS, and an sPDCCH which schedules an sPUSCH in an sPDCCH USS, in a specific subframe.

A main reason for the LLR UE to monitor a legacy PDCCH during data transmission/reception in an sTTI may be to receive broadcast data or an RRC signal. Therefore, the UE may receive broadcast data, and unicast data for transmission of an RRC signal or the like during transmission of a PUSCH in an sTTI.

Therefore, the PDSCH and the sPUSCH may be scheduled and transmitted in the same subframe.

Additionally, it is proposed that while the LLR UE performs data transmission/reception in an sTTI, the LLR UE assumes that a PUSCH is not scheduled by a legacy PDCCH. A main reason for the LLR UE to monitor the legacy PDCCH during data transmission/reception in an sTTI may be to receive broadcast data or an RRC signal. Therefore, the UE may not need to transmit data on a legacy PUSCH.

Figure 10:
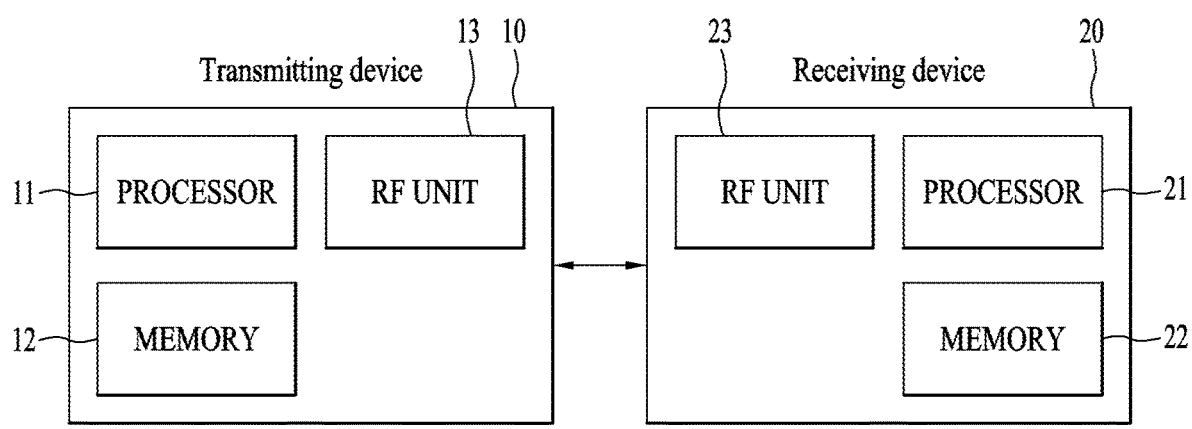
FIG. 10 is a block diagram illustrating components of a transmitting device 10 and a receiving device 20 for implementing the present disclosure.

FIG. 10 is a block diagram illustrating elements of a transmitting device 10 and a receiving device 20 for implementing the present disclosure.

The transmitting device 10 and the receiving device 20 respectively include radio frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present disclosure.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present disclosure. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present disclosure is implemented using firmware or software, the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present disclosure, a UE operates as the transmitting device 10 in UL and as the receiving device 20 in DL. In the embodiments of the present disclosure, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor and the UE processor according to the present disclosure are configured to allocate/decode a signal in an sTTI configured to be shorter than a legacy TTI. The sTTI may include a part of the OFDM symbols of the legacy TTI. Since the sTTI is configured within the legacy TTI, a signal transmitted/received based on the legacy TTI and a signal transmitted/received based on the sTTI may take place simultaneously in the time domain.

The eNB processor of the present disclosure may generate DL control information (e.g., a DL grant and a UL grant) according to any of the embodiments proposed in Section A to Section C. The eNB processor may control the eNB RF unit to transmit a PDCCH and/or an sPDCCH, which carries DCI, in a subframe or an sTTI according to any of the embodiments proposed in Section A to Section C. The eNB processor may control the eNB RF unit to transmit a PDSCH/sPDSCH in a subframe or an sTTI according to a DL grant. The eNB processor may control the eNB RF unit to receive a PUSCH/sPUSCH in a subframe or an sTTI according to a UL grant. A subframe/sTTI carrying the DL grant may be identical to the subframe/sTTI carrying the PDSCH/sPDSCH. A subframe/sTTI carrying the UL grant may be different from the subframe/sTTI carrying the PUSCH/sPUSCH. The difference between the transmission timing of the UL grant and the reception timing of the PUSCH/sPUSCH may be a predefined integer multiple of a subframe/sTTI.

The eNB processor may control the eNB RF unit to transmit, on a PDCCH, DCI for scheduling a data channel (e.g., a PDSCH or a PUSCH) allocated to a data region of a subframe, or DCI for scheduling a data channel (e.g., an sPDSCH or an sPUSCH) allocated to an sTTI. The eNB processor may control the eNB RF unit to transmit the corresponding PDCCH in one of decoding candidates for a 1-ms TTI or one of decoding candidates for an sTTI, according to a TTI based on which the data channel is transmitted/received, for example, depending on whether the data channel is transmitted based on the 1-ms TTI or the sTTI.

The eNB processor may control the eNB RF unit to transmit, on an sPDCCH, DCI for scheduling a data channel (e.g., a PDSCH or a PUSCH) allocated to a data region of a subframe, or DCI for scheduling a data channel (e.g., an sPDSCH or an sPUSCH) allocated to an sTTI. The eNB processor may control the eNB RF unit to transmit the corresponding sPDCCH in one of decoding candidates for a 1-ms TTI or one of decoding candidates for an sTTI, according to a TTI based on which the data channel is transmitted/received, for example, depending on whether the data channel is transmitted based on the 1-ms TTI or the sTTI.

For example, the eNB processor may control the eNB RF unit to transmit/receive the data channel based on the DCI transmitted in one of the decoding candidates for the 1-ms TTI, in a data region of the 1-ms TTI. The eNB processor may control the eNB RF unit to receive the data channel based on the DCI transmitted in one of the decoding candidates for the sTTI, within the sTTI.

The UE processor of the present disclosure may control the UE RF unit to receive a PDCCH and/or an sPDCCH, which carries DCI (e.g., a DL grant or a UL grant), in a subframe or an sTTI according to any of the embodiments proposed in Section A to Section C. The UE processor may control the UE RF unit to receive a PDSCH/sPDSCH in a subframe or an sTTI according to a DL grant. The UE processor may control the UE RF unit to transmit a PUSCH/sPUSCH in a subframe or an sTTI according to a UL grant. A subframe/sTTI carrying the DL grant may be identical to the subframe/sTTI carrying the PDSCH/sPDSCH. A subframe/sTTI carrying the UL grant may be different from the subframe/sTTI carrying the PUSCH/sPUSCH. The difference between the reception timing of the UL grant and the transmission timing of the PUSCH/sPUSCH may be a predefined integer multiple of a subframe/sTTI.

The UE processor may control the UE RF unit to receive, on a PDCCH, DCI for scheduling a data channel (e.g., a PDSCH or a PUSCH) allocated to a data region of a subframe, or DCI for scheduling a data channel (e.g., an sPDSCH or an sPUSCH) allocated to an sTTI. The UE processor may control the UE RF unit to transmit/receive the data channel based on a 1-ms TTI or an sTTI according to a decoding candidate in which the DCI has been detected/received, for example, depending on whether the decoding candidate is for a data channel transmitted/received based on the 1-ms TTI or a data channel transmitted/received based on the sTTI, among a plurality of decoding candidates.

The UE processor may control the UE RF unit to receive, on an sPDCCH, DCI for scheduling a data channel (e.g., a PDSCH or a PUSCH) allocated to a data region of a subframe, or DCI for scheduling a data channel (e.g., an sPDSCH or an sPUSCH) allocated to an sTTI. The UE processor may control the UE RF unit to transmit/receive the data channel based on a 1-ms TTI or an sTTI according to a decoding candidate in which the DCI has been detected/received, for example, depending on whether the decoding candidate is for a data channel transmitted/received based on the 1-ms TTI or a data channel transmitted/received based on the sTTI, among a plurality of decoding candidates.

For example, the UE processor may control the UE RF unit to transmit/receive the data channel based on the DCI transmitted in one of the decoding candidates for the 1-ms TTI, in a data region of the 1-ms TTI. The UE processor may control the UE RF unit to receive the data channel based on the DCI transmitted in one of the decoding candidates for the sTTI, within the sTTI.

As described above, the detailed description of the preferred embodiments of the present disclosure has been given to enable those skilled in the art to implement and practice the invention. Although the invention has been described with reference to exemplary embodiments, those skilled in the art will appreciate that various modifications and variations can be made in the present disclosure without departing from the spirit or scope of the invention described in the appended claims. Accordingly, the invention should not be limited to the specific embodiments described herein, but should be accorded the broadest scope consistent with the principles and novel features disclosed herein.

Industrial Applicability

The embodiments of the present disclosure are applicable to a BS, a UE, or other devices in a wireless communication system.

The invention claimed is:

1. A method for receiving downlink control information (DCI) by a user equipment (UE), the method comprising:
receiving a radio resource control (RRC) signal; and
monitoring N decoding candidates in a common search space configured for a first DCI based on the RRC signal, where N is an integer larger than 1,
wherein the common search space is one of multiple search spaces in a control region for a transmission time interval (TTI),
wherein the TTI includes 14 orthogonal frequency division multiplexing (OFDM) symbols in a time domain,
wherein the common search space is at an aggregation level L, and consists of the N decoding candidates for the aggregation level L,
wherein each of the N decoding candidates consists of L control channel elements (CCEs),
wherein the monitoring the N decoding candidates in the common search space comprises:
monitoring first M decoding candidates, among the N decoding candidates in the common search space, to detect a second DCI different from the first DCI, where M is a positive integer smaller than N,
wherein only the first M decoding candidates, among the N decoding candidates in the common search space, are available for the second DCI in the common search space, and remaining N-M decoding candidates, among the N decoding candidates in the common search space, are not available for the second DCI in the common search space where M is a positive integer smaller than N-M, and
wherein the RRC signal includes information regarding the first M decoding candidates available for the second DCI.

2. The method according to claim 1, wherein the remaining N-M decoding candidates, among the N decoding candidates in the common search space, are available for the first DCI in the common search space.

3. The method according to claim 1, wherein the multiple search spaces have different aggregation levels.

4. The method according to claim 1, wherein the RRC signal includes time domain related information for the first DCI,
wherein the time domain related information includes a monitoring period, a monitoring offset and a monitoring duration, and
wherein the monitoring period, the monitoring offset and the monitoring duration are related to a time position in which the UE is to monitor the common search space.

5. The method according to claim 1, wherein the first DCI has a first DCI format, and the second DCI has a second DCI format, and
wherein the first DCI format and the second DCI format are different from each other.

6. A user equipment (UE) for receiving downlink control information (DCI), the UE comprising:
a receiver; and
a processor connected to the receiver, and configured to:
control the receiver to receive a radio resource control (RRC) signal, and
monitor N decoding candidates in a common search space configured for a first DCI based on the RRC signal, where N is an integer larger than 1,
wherein the common search space is one of multiple search spaces in a control region for a transmission time interval (TTI),
wherein the TTI includes 14 orthogonal frequency division multiplexing (OFDM) symbols in a time domain,
wherein the common search space is at an aggregation level L, and consists of the N decoding candidates for the aggregation level L,
wherein each of the N decoding candidates consists of L control channel elements (CCEs),
wherein the processor is configured to monitor first M decoding candidates, among the N decoding candidates in the common search space, to detect a second DCI different from the first DCI, where M is a positive integer smaller than N,
wherein only the first M decoding candidates, among the N decoding candidates in the common search space, are available for the second DCI in the common search space, and remaining N-M decoding candidates, among the N decoding candidates in the common search space, are not available for the second DCI in the common search space where M is a positive integer smaller than N-M, and
wherein the RRC signal includes information regarding the first M decoding candidates.

7. The UE according to claim 6, wherein the remaining N-M decoding candidates, among the N decoding candidates in the common search space, are available for the first DCI in the common search space.

8. The UE according to claim 6, wherein the multiple search spaces have different aggregation levels.

9. The UE according to claim 6, wherein the RRC signal includes time domain related information for the first DCI,
wherein the time domain related information includes a monitoring period, a monitoring offset and a monitoring duration, and
wherein the monitoring period, the monitoring offset and the monitoring duration are related to a time position in which the UE is to monitor the common search space.

10. The UE according to claim 6, wherein the first DCI has a first DCI format, and the second DCI has a second DCI format, and
wherein the first DCI format and the second DCI format are different from each other.

11. A method for transmitting downlink control information (DCI) by a base station (BS), the method comprising:
transmitting a radio resource control (RRC) signal; and
transmitting at least a second DCI in a common search space configured for a first DCI different from the second DCI, based on the RRC signal,
wherein the common search space is one of multiple search spaces in a control region for a transmission time interval (TTI),
wherein the TTI includes 14 orthogonal frequency division multiplexing (OFDM) symbols in a time domain,
wherein the common search space is at an aggregation level L, and consists of N decoding candidates for the aggregation level L, where N is an integer larger than 1,
wherein each of the N decoding candidates consists of L control channel elements (CCEs),
wherein the transmitting the second DCI in the common search space comprises:
transmitting the second DCI in one of first M decoding candidates, among the N decoding candidates in the common search space,
wherein only the first M decoding candidates, among the N decoding candidates in the common search space, are available for the second DCI in the common search space, and remaining N-M decoding candidates, among the N decoding candidates in the common search space, are not available for the second DCI in the common search space where M is a positive integer smaller than N-M, and wherein the RRC signal includes information regarding the first M decoding candidates available for the second DCI.

12. The method according to claim 11, wherein the remaining N-M decoding candidates, among the N decoding candidates in the common search space, are available for the first DCI.

13. The method according to claim 11, wherein the multiple search spaces have different aggregation levels.

14. The method according to claim 11, wherein the RRC signal includes time domain related information for the first DCI, wherein the time domain related information includes a monitoring period, a monitoring offset and a monitoring duration, and wherein the monitoring period, the monitoring offset and the monitoring duration are related to a time position in which a user equipment is to monitor the common search space.

15. The method according to claim 11, wherein the first DCI has a first DCI format, and the second DCI has a second DCI format, and wherein the first DCI format and the second DCI format are different from each other.

16. A base station (BS) for transmitting downlink control information (DCI), the BS comprising:

a transmitter; and a processor connected to the transmitter, and configured to:

control the transmitter to transmit at least a second DCI in a common search space configured for a first DCI different from the second DCI, based on the RRC signal, wherein the common search space is one of multiple search spaces in a control region for a transmission time interval (TTI), wherein the TTI includes 14 orthogonal frequency division multiplexing (OFDM) symbols in a time domain, wherein the common search space is at an aggregation level L, and consists of N decoding candidates for the aggregation level L, where N is an integer larger than 1, wherein each of the N decoding candidates consists of L control channel elements (CCEs), wherein the processor is configured to control the transmitter to transmit the second DCI in one of first M decoding candidates, among the N decoding candidates in the common search space, wherein only the first M decoding candidates, among the N decoding candidates in the common search space, are available for the second DCI in the common search space, and remaining N-M decoding candidates, among the N decoding candidates in the common search space, are not available for the second DCI in the common search space where M is a positive integer smaller than N-M, and wherein the RRC signal includes information regarding the first M decoding candidates available for the second DCI.

17. The BS according to claim 16, wherein the remaining N-M decoding candidates, among the N decoding candidates in the common search space, are available for the first DCI.

18. The BS according to claim 16, wherein the multiple search spaces have different aggregation levels.

19. The BS according to claim 16, wherein the RRC signal includes time domain related information for the first DCI, wherein the time domain related information includes a monitoring period, a monitoring offset and a monitoring duration, and wherein the monitoring period, the monitoring offset and the monitoring duration are related to a time position in which a user equipment is to monitor the common search space.

20. The BS according to claim 16, wherein the first DCI has a first DCI format, and the second DCI has a second DCI format, and wherein the first DCI format and the second DCI format are different from each other.

* * * * *